United States Patent [19]

Aizawa

[11] Patent Number: 4,903,333

[45] Date of Patent: Feb. 20, 1990

[54] APPARATUS FOR AUTOMATICALLY ADJUSTING LENGTH OF ANTENNA OF RADIO RECEIVER

[75] Inventor: Hideo Aizawa, Iwaki, Japan

[73] Assignee: Alpine Electronics Inc., Tokyo, Japan

[21] Appl. No.: 274,736

[22] Filed: Nov. 14, 1988

[30] Foreign Application Priority Data

Jan. 28, 1987 [JP] Japan .................................. 62-17910

[51] Int. Cl.$^4$ ............................................... H04B 1/06
[52] U.S. Cl. .................... 455/269; 343/711; 343/713
[58] Field of Search .............. 343/711, 713, 714, 703, 343/722; 455/234, 269, 254, 270, 278, 280, 283, 290, 232; 318/10, 16

[56] References Cited

U.S. PATENT DOCUMENTS

| | | | |
|---|---|---|---|
| 2,939,950 | 6/1960 | Holmes | 455/234 |
| 3,010,014 | 11/1961 | Tanimura et al. | 455/269 |
| 3,022,420 | 2/1962 | Brinkerhoff | 343/714 X |
| 3,143,706 | 8/1964 | Michael | 455/280 X |
| 4,397,041 | 8/1983 | Takeda et al. | 455/277 |

Primary Examiner—Ulysses Weldon
Attorney, Agent, or Firm—Guy W. Shoup; Brian D. Ogonowsky

[57] ABSTRACT

Disclosed is here an apparatus for automatically adjusting a length of the antenna of the radio receiver in which the antenna is disposed to be integral with a high-frequency circuit section and a tuning circuit is configured to be in a variable capacity system. The apparatus includes a unit for detecting a condition that an intensity of an antenna input electric field is at least an optimal range so as to generate a first signal, a unit for detecting a condition that the intensity of the antenna input electric field is at most an optimal range so as to generate a second signal, a unit for detecting a condition that an interference signal is at least at a predetermined level so as to generate the second signal, a device for elongating the antenna based on the first signal, and a device for shortening the antenna based on the second signal.

4 Claims, 2 Drawing Sheets

APPARATUS FOR AUTOMATICALLY ADJUSTING LENGTH OF ANTENNA OF RADIO RECEIVER

This application is a continuation of application Ser. No. 07/102,422, filed Sept. 29, 1987, now abandoned.

BACKGROUND OF THE INVENTION

1. Field of the Invention

The present invention relates to an apparatus for adjusting a length of an antenna of a radio receiver.

2. Description of the Prior Art

In the conventional car radio receiver, a rod antenna has been used and the rod antenna and the body of the car radio receiver is connected by means of a high-frequency cable.

However, when the high-frequency cable having a long distance is installed, the loss associated with the cable is increased and the noise is easily picked up; furthermore, the capacity of the high-frequency cable is added to that of the tuning circuit to increase the fixed capacity. As a consequence, in the variable capacity system in which the tuning frequency is changed by controlling a variable capacitance, a broad tuning range cannot be established. In addition, a satisfactory reception of radio waves is impossible if the length of the antenna is not appropriate; moreover, the antenna length is apt to be increased to receive particularly an AM signal or the like. In such a case, there has been a disadvantage that an accident may occur, for example, the elongated antenna is prevented by some hindrance and is broken when the car is driven into a garage.

SUMMARY OF THE INVENTION

It is therefore an object of the present invention to integrate the antenna with the body of the radio set in the variable capacitance system and to use a power antenna so as to optimally adjust the length of the antenna according to a level of an input signal and a level of a disturbing signal.

As described above, since the high-frequency cable is dispensed with, the fixed capacitance of the antenna tuning circuit is minimized and hence the tuning range can be broaden even in the variable capacitance system; furthermore, the length of the antenna can be optimized.

BRIEF DESCRIPTION OF THE DRAWINGS

The present invention will be apparent from the following detailed description taken in conjunction with the accompanying drawings in which.

DESCRIPTION OF THE PREFERRED EMBODIMENT

Figure 1:
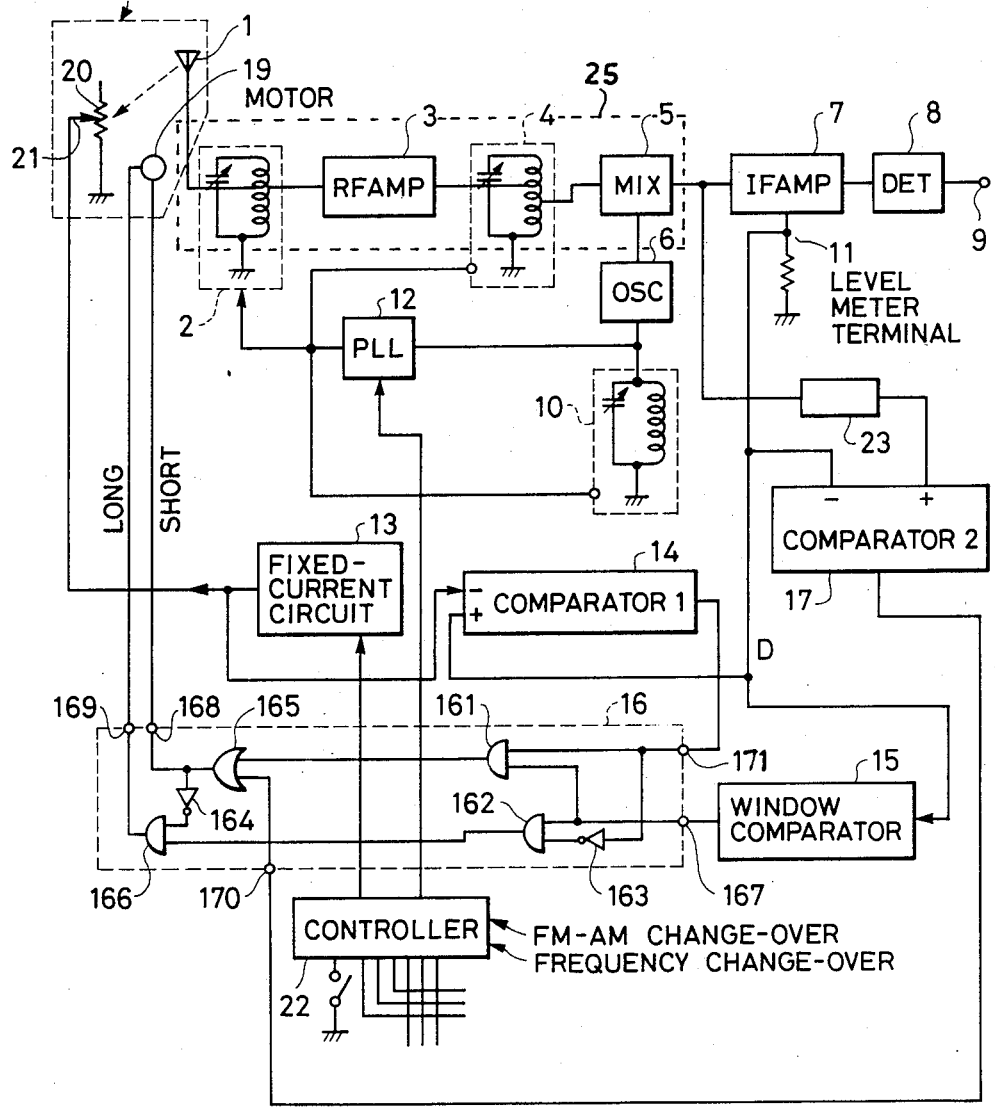
FIG. 1 is a schematic block diagram showing an embodiment of the present invention and FIG. 2 is a schematic explanatory diagram useful for explaining the operation of the embodiemnt of FIG. 1.

FIG. 1 is a schematic block diagram showing an embodiment of the present invention. In the configuration of FIG. 1, an RF signal generated by an antenna 1 is amplified in an RF circuit section comprising an antenna tuning circuit 2, an RF amplifier 3, and an RF tuning circuit 4. In a mixer 5, the resultant signal is then mixed with a local oscillation signal produced from a local oscillator 6 including an oscillation tuning circuit 10 so as to be converted into an IF signal, which is applied to a detector 23 and to an IF amplifier 7, which in turn amplifies the IF signal and sends the amplified signal to a demodulator 8. Finally, the demodulated signal is delivered to an output terminal 9.

A level meter terminal 11 is supplied with a level meter output to indicate an IF output level. The level meter output is applied to comparators 14 and 17 and to a window comparator 15. Outputs from the comparators 14, 15, and 17 are supplied to input terminals 171, 167, and 170, respectively, of gate circuit 16. The gate circuit 16 includes AND circuits 161, 162, and 166, NOT circuits 163-164, and an OR circuit 165. Outputs from the OR circuit 165 and the AND circuit 166 are fed to output terminals 168 and 169, respectively so as to be applied to a motor 19. A controller 22 generates control outputs depending on an FM/AM changeover, a frequency change-over, and the like and sends the output signals to control terminals of a PLL circuit 12 and a fixed-current circuit 13. The motor 19 decreases the length of the antenna 1 depending on the output 168 from the gate circuit 16 and increases the length of the antenna 1 depending on the output 169 therefrom. A volume control 20 has a slider which is moved in cooperation with a variation of the length of the antenna 1. The slider 21 is connected to another input terminal of the comparator 14 and an output terminal of the fixed current circuit 13. An input terminal of the PLL circuit 12 is supplied with a local oscillation signal from the local oscillator 6, whereas an output terminal of the PLL circuit 12 is connected to control terminals for controlling tuning capacity of the antenna tuning circuit 2, the RF tuning circuit 4, and the local oscillation tuning circuit 10, respectively.

Moreover, in the embodiment, the section 25 of a high-frequency signal processing circuit shown in dashed outline ranging from the antenna tuning circuit 2 to the mixer 5 is formed to be integral with the antenna 1 without using a high-frequency cable.

A description will now be given of the configuration described above. Although the operation of the signal receiving circuit itself is the same as that of the known radio receiver, since the antenna 1 is directly connected to the RF circuit section in the embodiment as described above, the fixed capacity associated with the connecting cable is not included in the fixed capacity of the antenna tuning circuit 2 and the RF tuning circuit 4, the tuning frequency can be set in a quite broad range even when the variable capacity system is used.

The PLL circuit 12 compares the reference frequency beforehand prepared in the system with a local oscillation frequency of the local oscillator 6 to generate a control voltage. In order to set the local oscillation frequency to a predetermine value, the control voltage is applied to a variable capacity of the tuning circuit 10 of the local oscillator 6, thereby effecting the PLL control. The same control voltage is also applied to variable capacity of the antenna tuning circuit 2 and the RF tuning circuit 4 so as to control the tuning frequencies. The reference frequency is changed by the controller 22 depending on operations of the FM/AM change-over and the frequency change-over. As a result, according to a desired receiving frequency, the tuning frequencies of the respective tuning circuits 2, 4, and 10 are changed to be adjusted to the optimal tuning points.

Figure 2:
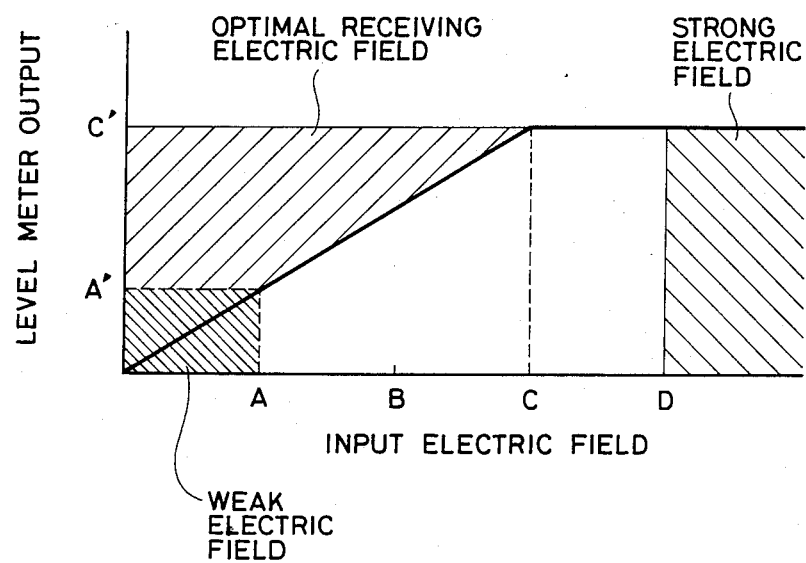

Furthermore, the output from the window comparator 15 is set to a low level when the sensitivity of the antenna 1 is in the optimal range, whereas the output is set to a high level when the sensitivity is beyond the optimal range. That is, as shown in FIG. 2, the relationships between the intensity of the antenna input electric field and the level meter output at the level meter terminal 11 are indicated with a substantially linear line; however, when the input electric field is excessively strong, the level meter output saturates as shown in a range indicated by D on the right side of point C in the diagram, which leads to a disadvantage for the operation of the apparatus. When the electric field is too weak, namely, in the range on the left side of point A as shown in FIG. 2, the S/N ratio is deteriorated and hence the tone quality is lowered. For the AM signals, the sensitivity of the antenna 1 becomes higher as the length of the antenna 1 is increased; however, when the antenna length is too long, there may arise a problem, for example, the antenna 1 is destroyed by some hindrance when the car is moved into a garage. To overcome such a difficulty, the window comparator 15 detects the optimal range from A to C in FIG. 2 depending on the voltage on the level meter terminal 11 so as to set the output therefrom to a low level. The window comparator 15 sets the output to a high level when the voltage on the level meter terminal 11 is beyond the optimal range. The antenna 1 is so designed that the length thereof is adjusted by the motor 19. In the slider 21 moving according to the length of the antenna 1 as described above, there is generated a voltage in association with a fixed current from the fixed-current circuit 13. Namely, the direction of the sliding motion of the slider 21 is determined so that the voltage is lowered in proportion to the increase of the length of the antenna 1. Moreover, the voltage on the level meter terminal 11 is increased as the IF output becomes greater. Consequently, particularly in a case of reception of an AM radio wave, the voltage on the level meter terminal 11 is increased when the length of the antenna 1 becomes longer. The comparator 14 checks the voltage appearing on the level meter terminal 11 with reference to the voltage of the slider 21 so as to detect the strength of the input electric field of the antenna 1. Namely, if the strength of the input electric field is stronger than that developed at an appropriate point B in the optimal range A-C of FIG. 2, a high-level output is applied to the input terminal 166 of the gate circuit 16; otherwise, a low-level output is applied thereto.

Next, the operation of the comparator 17 will be described. In general, when the radio wave interference is great, the interference can be reduced to some extent by minimizing the antenna sensitivity. The comparator 17 is disposed to detect the magnitude of the radio wave interference. The output from the mixer 5 to be compared in the comparator 17 also includes a noise in addition to the IF output. Consequently, the output from the mixer 5 becomes to be greater as the interference increases. On the other hand, in the IF amplifier 7, since most interference is removed by the high selectivity thereof, even when the interference is increased, the output from the level meter terminal 11 is not increased as compared with the output from the mixer 5. As a result, when a level adjusting operation is appropriately effected between the output from the mixer 5 and that from the level meter terminal 11 before the outputs are compared in the comparator 17, the output terminal of the comparator 17 can be set to a high level only when the magnitude of the interference exceeds a predetermined level.

A description will now be given of the operation concerning the automatic adjustment of the length of the antenna 1.

Let us consider a case where the output from the window comparator 15 and the output from the comparator 14 are at a high level and a low level, respectively, namely, where the electric field strength is too weak like in the range on the left side of the point A of FIG. 2. In this case, the output terminal 168 of the gate circuit 16 is at a low level and the output terminal 169 thereof is at a high level. Consequently, the motor 19 takes action to elongate the length of the antenna 1 for the higher sensitivity.

Furthermore, let us consider a case where the output from the window comparator 15 and the output from the comparator 14 are respectively at a high level, namely, where the electric field strength is too strong like in the range on the right of the point C of FIG. 2. In this case, contrarily, the output terminal 168 of the gate circuit 16 is at a high level and the output terminal 169 thereof is at a low level. Consequently, the motor 19 takes action to reduce the length of the antenna 1 for the lower sensitivity. When the output terminal 168 is at a high level, the NOT circuit 164 operates to set the output terminal to a low level in any case so that the output terminal 168 takes precedence; as a consequence, both of the output terminals 168 and 169 cannot be simultaneously set to a high level.

Next, in a case where the output from the window comparator 15 is at a low level, namely, where the electric field strength is in the optimal range from A to C of FIG. 2, the output terminal 169 is at a low level regardless of the output from the comparator 14, whereas the output from the output terminal 168 is determined according to the output from the comparator 17. If the level of the wave interference is small, the output from the comparator 17 is at a low level as described above and hence the output terminal 168 is also set to a low level. In this case, since both output terminals 168 and 169 are at a low level, the motor 19 is not activated and the antenna 1 is kept remained in the state associated with the optimal sensitivity. Furthermore, as described above, when the level of the interference is greater than a predetermined level, the output from the comparator 17 is set to a high level and hence the output terminal 168 is also set to a high level. As a result, the motor 19 operates to decrease the length of the antenna 1 to lower the sensitivity of the antenna 1 within the optimal sensitivity range, thereby relieving the system from the interference as described above.

According to the present invention, as described above, the length of the antenna can be kept remained in a range associated with a minimized interference within the optimal sensitivity range; consequently, furthermore, there is attained an advantageous effect that an accident of destruction of the antenna due to an excessively elongated length thereof can be prevented.

While the present invention has been described with reference to the particular illustrative embodiment, it is not restricted by the embodiment but only by the appended claims. It is to be appreciated that those skilled in the art can change and modify the embodiment without departing from the scope and spirit of the invention.

What is claimed is:

1. An apparatus for automatically adjusting a length of an antenna for a radio receiver comprising:
   first means coupled to an antenna through an amplifying means and coupled to a means for outputting a signal level corresponding to a length of said antenna, said first means for generating a first signal and a third signal, said first signal being generated when said first means detects a condition where a signal outputted by said amplifying means, corresponding to an intensity of an antenna input electric field, is below said signal level corresponding to a length of said antenna, said third signal being generated when said first means detects a condition where said signal outputted by said amplifying means is above said signal level corresponding to a length of said antenna;

second means coupled to said antenna through said amplifying means, said second means for detecting a condition that the signal outputted by said amplifying means is outside of an optimum range and, upon such detection, generating a second signal;

third means coupled to said antenna through said amplifying means so as to receive a signal containing interference at a first terminal and receive a signal containing substantially no interference at a second terminal, said third means for detecting a condition that radio wave interference is above a predetermined level and, upon such detection, generating a fourth signal and for detecting a condition that said radio wave interference is below said predetermined level and, upon such detection, generating a fifth signal;

fifth means having input terminals coupled to outputs of said first, second, and third means, said fifth means including means mechanically coupled to said antenna for elongating and shortening said antenna, said fifth means for elongating said antenna in response to a simultaneous generation of the first, second, and fifth signals and for shortening said antenna in response to said fourth signal or a simultaneous generation of said second signal and said third signal.

2. The apparatus of claim 1 wherein said fifth means for elongating and shortening the antenna includes a motor and logic means having inputs being said first, second, third, fourth and fifth signals, wherein said logic means provides a sixth signal to said motor for elongating the antenna and a seventh signal to said motor for shortening said antenna.

3. The apparatus of claim 1 wherein said means for detecting that radio wave interference is above a predetermined level comprises a comparator means which compares the magnitude of an intermediate frequency (IF) signal containing interference with the magnitude of said IF signal after said interference is substantially removed by an IF amplifier and causes said second signal to be generated if said magnitude of said IF signal containing interference exceeds by a predetermined amount said magnitude of said IF signal with said interference removed.

4. The apparatus of claim 1 wherein said first means for generating a first signal and a third signal comprises a first comparator, wherein said first comparator compares an intermediate frequency (IF) signal to said signal level corresponding to the length of said antenna, said first comparator generating said third signal at an output if said IF signal is greater than said signal level corresponding to said length of said antenna and generating said first signal at said output if said IF signal is less than said signal corresponding to said length of said antenna, and wherein said second means for generating said second signal comprises a window comparator which detects whether said IF signal is above or below an optimum range and, upon such detection, generates said second signal at an output.

* * * * *

UNITED STATES PATENT AND TRADEMARK OFFICE
CERTIFICATE OF CORRECTION

PATENT NO. : 4,903,333

DATED : February 20, 1990

INVENTOR(S) : Hideo Aizawa

It is certified that error appears in the above-identified patent and that said Letters Patent is hereby corrected as shown below:

On the title page:

Related U.S. Application data not on front of patent; should read: "Continuation of Serial No. 07/102,433 filed September 29, 1987, now abandoned."

Col. 6 Line 10 - Claim 3

--third-- should be inserted after "said"

Col. 6 Line 16

--fourth-- should be inserted in place of "second"

Signed and Sealed this

Seventh Day of May, 1991

Attest:

HARRY F. MANBECK, JR.

Attesting Officer

Commissioner of Patents and Trademarks